United States Patent
Hsu et al.

(10) Patent No.: US 10,488,560 B2
(45) Date of Patent: Nov. 26, 2019

(54) OPTICAL ELEMENTS

(71) Applicant: VisEra Technologies Company Limited, Hsin-Chu (TW)

(72) Inventors: Chung-Jung Hsu, Hsinchu (TW); Chin-Chuan Hsieh, Hsin-Chu (TW); Kuo-Feng Lin, Kaohsiung (TW)

(73) Assignee: VISERA TECHNOLOGIES COMPANY LIMITED, Hsin-Chu (TW)

( * ) Notice: Subject to any disclaimer, the term of this patent is extended or adjusted under 35 U.S.C. 154(b) by 0 days.

(21) Appl. No.: 15/895,405

(22) Filed: Feb. 13, 2018

(65) Prior Publication Data

US 2019/0250309 A1    Aug. 15, 2019

(51) Int. Cl.
| | |
|---|---|
| *G02B 3/00* | (2006.01) |
| *G02B 1/12* | (2006.01) |
| *G02B 1/04* | (2006.01) |
| *G02B 5/20* | (2006.01) |

(52) U.S. Cl.
CPC ............ *G02B 3/0006* (2013.01); *G02B 1/04* (2013.01); *G02B 1/12* (2013.01); *G02B 5/208* (2013.01)

(58) Field of Classification Search
CPC .. G02B 3/0006; G02B 3/0012; G02B 3/0037; G02B 3/0087; G02B 1/02; G02B 1/04; G02B 1/12; H01L 27/14627; H01L 27/14806; H01L 27/14818
See application file for complete search history.

(56) References Cited

U.S. PATENT DOCUMENTS

| | | | |
|---|---|---|---|
| 2008/0165399 A1 | 7/2008 | Ushiro et al. | |
| 2008/0303022 A1* | 12/2008 | Tai | H01L 27/14609 257/53 |
| 2010/0181635 A1* | 7/2010 | Wang | H01L 27/1463 257/432 |
| 2010/0237391 A1* | 9/2010 | Salinas | H01L 21/268 257/288 |
| 2010/0237451 A1* | 9/2010 | Murakoshi | H01L 27/1463 257/432 |

(Continued)

FOREIGN PATENT DOCUMENTS

| | | |
|---|---|---|
| CA | 2 558 035 A1 | 9/2005 |
| CN | 101783354 A | 7/2010 |

(Continued)

OTHER PUBLICATIONS

Office Action dated Sep. 5, 2019 in TW Application No. 107137703.

*Primary Examiner* — Sultan Chowdhury

(74) *Attorney, Agent, or Firm* — Muncy, Geissler, Olds & Lowe, P.C.

(57) ABSTRACT

An optical element is provided. The optical element includes an array structure having an implant area and a non-implant area. The non-implant area is adjacent to the implant area. The implant area has an implant concentration ranging from $1\times10^{13}$ cm$^{-2}$ to $6.7\times10^{13}$ cm$^{-2}$. The array structure is a color filter array including a plurality of color filters. At least one of the color filters has the implant area. The implant area has a first refractive index. The non-implant area has a second refractive index. The first refractive index is greater than the second refractive index.

20 Claims, 11 Drawing Sheets

(56) References Cited

U.S. PATENT DOCUMENTS

2012/0299139 A1\* 11/2012 Margutti .......... H01L 27/14627
257/432

FOREIGN PATENT DOCUMENTS

| EP | 1 726 977 A1 | 11/2006 |
|----|---|---|
| JP | 06-027317 A | 2/1994 |
| JP | 2000347023 A | 12/2000 |
| JP | 2007199386 A | 8/2007 |
| JP | 2012049270 A | 3/2012 |
| KR | 20060135817 A | 12/2006 |
| TW | 200602684 A | 1/2006 |
| TW | 200617526 A | 6/2006 |
| WO | WO-2005/088364 A1 | 9/2005 |

\* cited by examiner

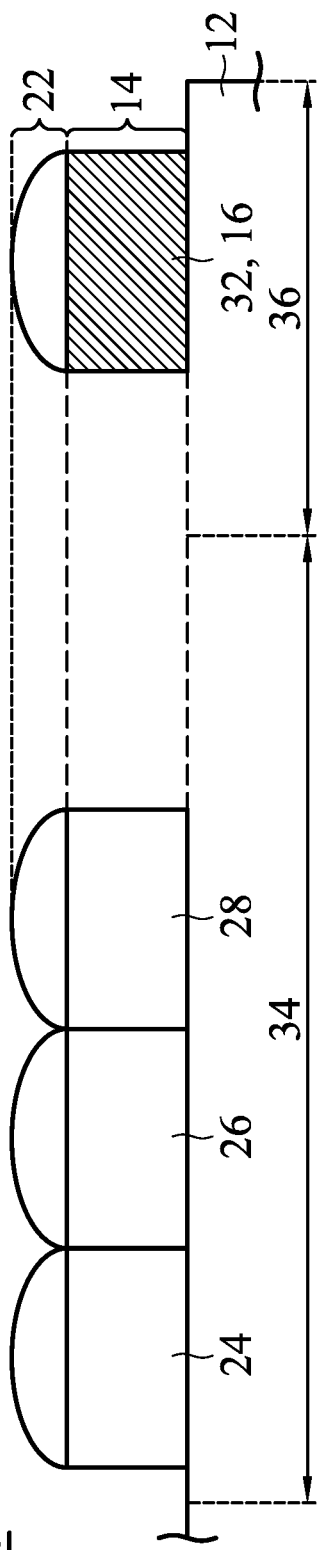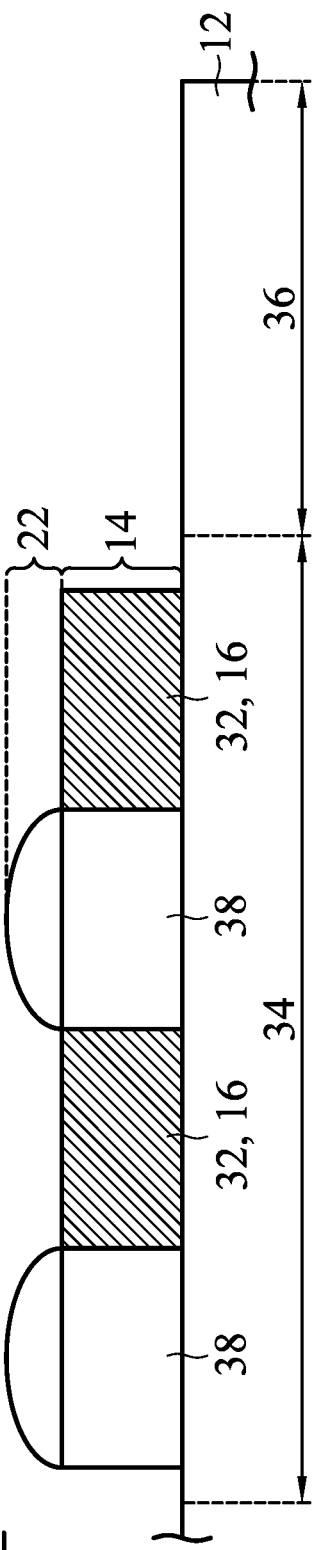

US 10,488,560 B2

OPTICAL ELEMENTS

BACKGROUND OF THE INVENTION

Field of the Invention

The invention relates to an optical element, and more particularly to an optical element with color filters or microlenses which have a light guide structure formed therein.

Description of the Related Art

For color filters used in the current generation of optical elements (which includes image sensors), the performance of the quantum effect (QE) is limited by the properties (i.e. spectrum profiles) of the color filter materials.

In order to increase the refractive index of a microlens, it is required, for example, that a metal oxide such as titanium dioxide be added into the microlens material. However, some problems emerge that can increase the difficulty of the processing, especially problems with the pollution that is generated during the etching process.

Therefore, development of a novel optical element using the materials of color filters or microlenses which have improved refractive index to form a light guide or condenser effect therein is desirable.

BRIEF SUMMARY OF THE INVENTION

In accordance with one embodiment of the invention, an optical element is provided. The optical element comprises an array structure having an implant area and a non-implant area adjacent to the implant area. The implant area has an implant concentration greater than $1 \times 10^{13}$ $cm^{-2}$.

In some embodiments, the implant concentration ranges from $1 \times 10^{13}$ $cm^{-2}$ to $6.7 \times 10^{13}$ $cm^{-2}$. In some embodiments, the implant area comprises nitrogen ion or silicon ion. In some embodiments, the implant area has a first refractive index and the non-implant area has a second refractive index, and the first refractive index is greater than the second refractive index.

In some embodiments, the array structure is a color filter array comprising a plurality of color filters, and at least one of the color filters has the implant area.

In some embodiments, the implant area has a width which is 50-95% of the width of the color filter having the implant area.

In some embodiments, the implant area is located at the bottom of the color filter having the implant area. In some embodiments, the implant area has a height which is at least 50% of the height of the color filter having the implant area. In some embodiments, the first refractive index of the implant area is a gradient refractive index that increases towards the bottom of the color filter having the implant area.

In some embodiments, the optical element further comprises a substrate having a sensing area. The color filter having the implant area comprises a black filter located at the sensing area of the substrate. In some embodiments, the optical element further comprises a transparent filter adjacent to the black filter. In some embodiments, the optical element further comprises a microlens formed on the transparent filter.

In some embodiments, the array structure comprises a color filter array comprising a plurality of color filters and a microlens array comprising a plurality of microlenses.

In some embodiments, at least one of the microlenses has the implant area. In some embodiments, the implant area has a refractive index which is greater than 1.75.

In some embodiments, the implant area has a width which is 50-95% of the width of the microlens having the implant area.

In some embodiments, at least one of the color filters has the implant area, and the color filter having the implant area comprises a green color filter, a red color filter and/or a blue color filter.

In some embodiments, at least one of the color filters has the implant area, and the color filter having the implant area comprises an IR-pass filter or a black filter. In some embodiments, the optical element further comprises a substrate having a sensing area. The IR-pass filter is located at the sensing area of the substrate. In some embodiments, the optical element further comprises a substrate having a peripheral area. The black filter is located at the peripheral area of the substrate.

In some embodiments, the implant area has an implant concentration which is greater than $3.3 \times 10^{13}$ $cm^{-2}$.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 6B is a cross-sectional view of an optical element in accordance with one embodiment of the invention;

FIG. 6C is a cross-sectional view of an optical element in accordance with one embodiment of the invention;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
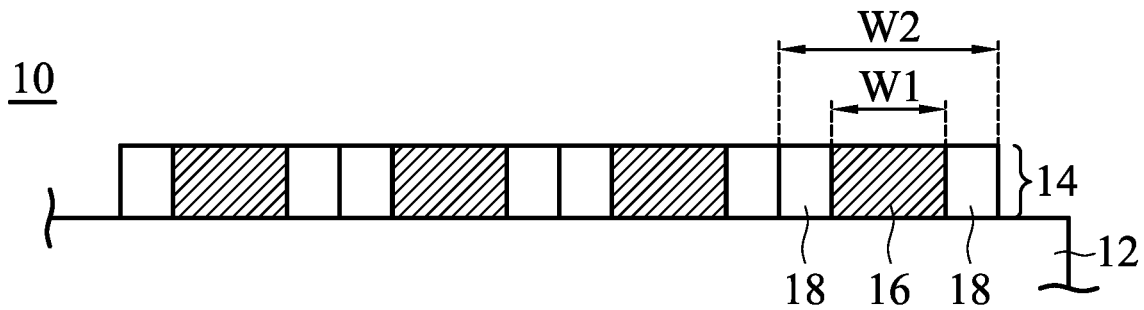
FIG. 1 is a cross-sectional view of an optical element in accordance with one embodiment of the invention.

Referring to FIG. 1, in accordance with one embodiment of the invention, an optical element 10 is provided. FIG. 1 shows a cross-sectional view of the optical element 10.

The optical element 10 comprises a substrate 12 and a plurality of color filters 14. The color filters 14 are formed on the substrate 12. At least one of the color filters 14 comprises an implant area 16 and a non-implant area 18. The implant area 16 has a first refractive index. The non-implant area 18 has a second refractive index. The implant area 16 is adjacent to the non-implant area 18. The first refractive index is greater than the second refractive index. That is, the refractive index of the implant area 16 is greater than that of the non-implant area 18. The plurality of color filters 14 are arranged as in rows and columns to form a color filter array (an array structure).

In some embodiments, the implant area 16 contained in the color filter 14 extends from the top to the bottom of the color filter 14. Therefore, the implant area 16 is formed as a "light guide" in the color filters 14.

In some embodiments, other suitable profiles for the implant area 16 which extend from the top to the bottom of the color filter 14 are also feasible.

In some embodiments, the color filters 14 may comprise suitable polymers, for example poly(methyl methacrylate) (PMMA), and pigments.

In some embodiments, the color filters 14 may comprise green (G) color filters, red (R) color filters and blue (B) color filters.

In some embodiments, all of the color filters 14 comprise the implant area 16 and the non-implant area 18.

In some embodiments, merely some of the color filters 14 comprise the implant area 16 and the non-implant area 18, which depends on the demands of practical application.

In some embodiments, the implant area 16 may comprise high-refractive-index dopants, for example dopants having a higher refractive index than 2.0 like nitrogen ion or silicon ion.

In the invention, as long as the refractive index of the implanted dopants is higher than that of the original color filters 14 to about 0.1 or above, a light guide effect is obtained in the color filters 14.

In some embodiments, the implant area 16 has a width W1 which is about 50-95% of a width W2 of the color filter 14.

In some embodiments, the implant area 16 has an implant concentration greater than $1\times10^{13}$ cm$^{-2}$, for example, ranging from about $1\times10^{13}$ cm$^{-2}$ to about $6.7\times10^{13}$ cm$^{-2}$.

The obtained implant concentration is based on a specific implant energy. While the implant energy is altered, the range of the implant concentration will be altered accordingly.

In some embodiments, the array structure may comprise the color filters or the microlenses with a certain thickness (along the z direction). The thickness of the microlenses is defined as a distance from the bottom to the apex thereof. During the ion implantation, the array structure is irradiated by nitrogen or silicon ions with an energy of 300 keV and at a dose from $1\times10^{13}$ cm$^{-2}$ to $6.7\times10^{13}$ cm$^{-2}$.

The unit of the implant concentration may generally be represented as "ions/cm$^3$". In some embodiments, the implant concentration may be defined as a concentration at a certain section in the z direction. In the case of "ions" is omitted, the unit of the implant concentration herein is represented as "cm$^{-2}$".

In some embodiments, the optimal range of an implant concentration (i.e. implant dose) under a specific implant energy (for example 300 keV) which is applied to the color filters 14 is defined in accordance with the following conditions. For incident light with a specific wavelength range, such as visible light with a longer wavelength than 400 nm, after an ion implantation process with an optimal implant concentration is performed on the color filters 14, the refractive index (n) of the color filters 14 is improved but the extinction coefficient (k) of the color filters 14 is maintained: that is, in addition to the formation of a light guide for the incident light in the color filters 14, the transmittance of the color filters 14 to the incident light is still maintained, improving the performance of the quantum effect (QE).

In some embodiments, the depth and profile of the implant area 16 are controlled by adjusting the implant concentration (i.e. implant dose) and the implant energy of the ion implantation process.

Figure 2:
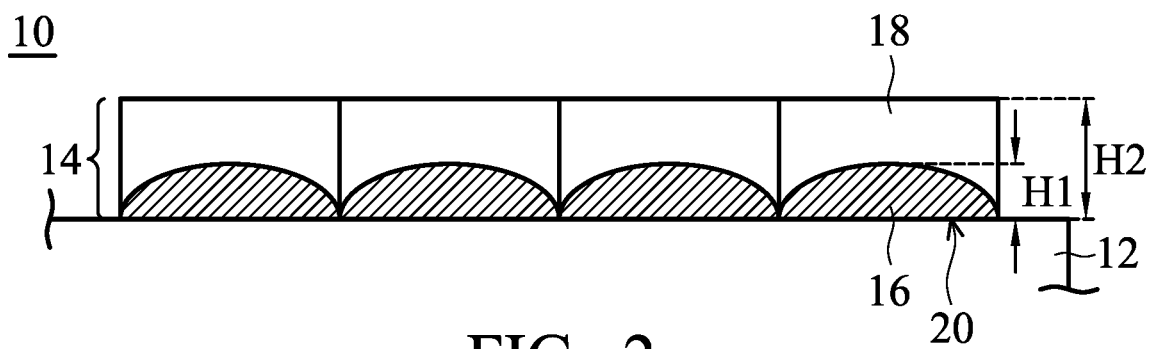
FIG. 2 is a cross-sectional view of an optical element in accordance with one embodiment of the invention.

Referring to FIG. 2, in accordance with one embodiment of the invention, an optical element 10 is provided. FIG. 2 shows a cross-sectional view of the optical element 10.

The optical element 10 comprises a substrate 12 and a plurality of color filters 14. The color filters 14 are formed on the substrate 12. At least one of the color filters 14 comprises an implant area 16 and a non-implant area 18. The implant area 16 has a first refractive index. The non-implant area 18 has a second refractive index. The implant area 16 is adjacent to the non-implant area 18. The first refractive index is greater than the second refractive index. That is, the refractive index of the implant area 16 is greater than that of the non-implant area 18. The plurality of color filters 14 are arranged as in rows and columns to form a color filter array (an array structure).

In some embodiments, the implant area 16 contained in the color filter 14 is located at the bottom 20 of the color filter 14, similar to a microlens profile. Therefore, the implant area 16 is formed as a "condenser" in the color filters 14.

In some embodiments, the first refractive index of the implant area 16 is a gradient refractive index that increases towards the bottom 20 of the color filter 14.

In some embodiments, other suitable profiles for the implant area 16 adjacent to the bottom 20 of the color filter 14 are also feasible.

In some embodiments, the color filters 14 may comprise suitable polymers, for example poly(methyl methacrylate) (PMMA), and pigments.

In some embodiments, the color filters 14 may comprise green (G) color filters, red (R) color filters and blue (B) color filters.

In some embodiments, all of the color filters 14 comprise the implant area 16 and the non-implant area 18.

In some embodiments, merely some of the color filters 14 comprise the implant area 16 and the non-implant area 18, which depends on the demands of practical application.

In some embodiments, the implant area 16 may comprise high-refractive-index dopants, for example dopants having a higher refractive index than 2.0 like nitrogen ion or silicon ion.

In the invention, as long as the refractive index of the implanted dopants is higher than that of the original color filters 14 to about 0.1 or above, a condenser effect is obtained in the color filters 14.

In some embodiments, the implant area 16 has a height H1 which is at least 50% of a height H2 of the color filter 14.

In the invention, the implant area 16 (i.e. a condenser) is formed in the color filters 14 and the quantum effect (QE) is thus improved. Specifically, when the height H1 of the implant area 16 is greater than 50% of the height H2 of the color filter 14, the improvement of the quantum effect (QE) is more significant.

In some embodiments, the implant area 16 has an implant concentration greater than $1\times10^{13}$ cm$^{-2}$, for example, ranging from about $1\times10^{13}$ cm$^{-2}$ to about $6.7\times10^{13}$ cm$^{-2}$.

In some embodiments, the optimal range of an implant concentration (i.e. implant dose) under a specific implant energy (for example 300 keV) which is applied to the color filters 14 is defined in accordance with the following conditions. For incident light with a specific wavelength range, such as visible light with a longer wavelength than 400 nm, after an ion implantation process with an optimal implant concentration is performed on the color filters 14, the refractive index (n) of the color filters 14 is improved but the extinction coefficient (k) of the color filters 14 is maintained: that is, in addition to the formation of a condenser for collecting the incident light in the color filters 14, the transmittance of the color filters 14 to the incident light is still maintained.

In some embodiments, the depth and profile of the implant area 16 are controlled by adjusting the implant concentration (i.e. implant dose) and the implant energy of the ion implantation process.

Figure 3:
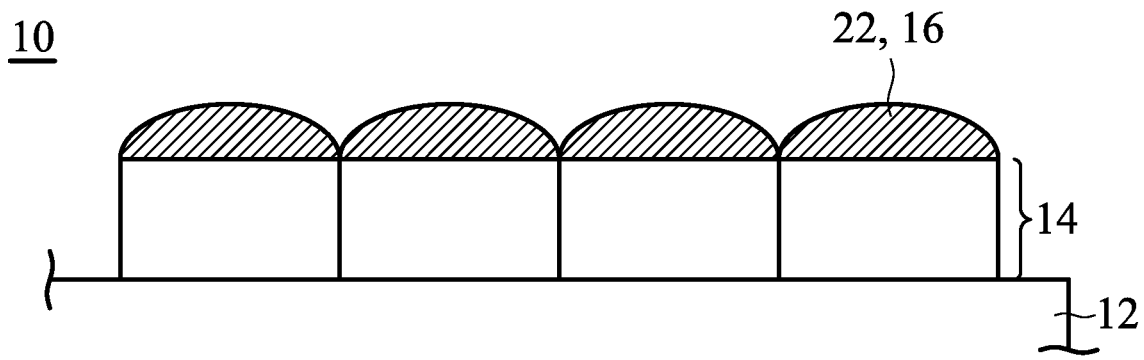
FIG. 3 is a cross-sectional view of an optical element in accordance with one embodiment of the invention.

Referring to FIG. 3, in accordance with one embodiment of the invention, an optical element 10 is provided. FIG. 3 shows a cross-sectional view of the optical element 10.

The optical element 10 comprises a substrate 12, a plurality of color filters 14 and a plurality of microlenses 22. The color filters 14 are formed on the substrate 12. The microlenses 22 are formed on the color filters 14. At least one of the microlenses 22 comprises an implant area 16. The refractive index of the implant area 16 is greater than that of conventional microlenses without applying an ion implantation process thereon. Therefore, the microlenses 22 comprising the implant area 16 generate an improved condenser effect. The plurality of color filters 14 are arranged as in rows and columns to form a color filter array (an array structure). The plurality of microlenses 22 are arranged as in rows and columns to form a microlens array (an array structure).

In some embodiments, whole microlens 22 is the implant area 16.

In some embodiments, the implant area 16 has a refractive index which is greater than about 1.75.

In some embodiments, the color filters 14 may comprise suitable polymers, for example poly(methyl methacrylate) (PMMA), and pigments.

In some embodiments, the color filters 14 may comprise green (G) color filters, red (R) color filters and blue (B) color filters.

In some embodiments, the microlenses 22 may comprise suitable polymers, for example poly(methyl methacrylate) (PMMA).

In some embodiments, all of the microlenses 22 comprise the implant area 16.

In some embodiments, merely some of the microlenses 22 comprise the implant area 16, which depends on the demands of practical application.

In some embodiments, the implant area 16 may comprise high-refractive-index dopants, for example dopants having a higher refractive index than 2.0 like nitrogen ion or silicon ion.

In the invention, as long as the refractive index of the implanted dopants is higher than that of the conventional microlenses to about 0.1 or above, the improved condenser effect is obtained in the microlenses 22 comprising the implant area 16.

In some embodiments, the implant area 16 has an implant concentration greater than $1\times10^{13}$ cm$^{-2}$, for example, ranging from about $1\times10^{13}$ cm$^{-2}$ to about $6.7\times10^{13}$ cm$^{-2}$.

In some embodiments, the optimal range of an implant concentration (i.e. implant dose) under a specific implant energy (for example 300 keV) which is applied to the microlenses 22 is defined in accordance with the following conditions. For incident light with a specific wavelength range, such as visible light with a longer wavelength than 400 nm, after an ion implantation process with an optimal implant concentration is performed on the microlenses 22, the refractive index (n) of the microlenses 22 is improved but the extinction coefficient (k) of the microlenses 22 is maintained: that is, in addition to improvement of collecting the incident light in the microlenses 22, the transmittance of the microlenses 22 to the incident light is still maintained.

Figure 4:
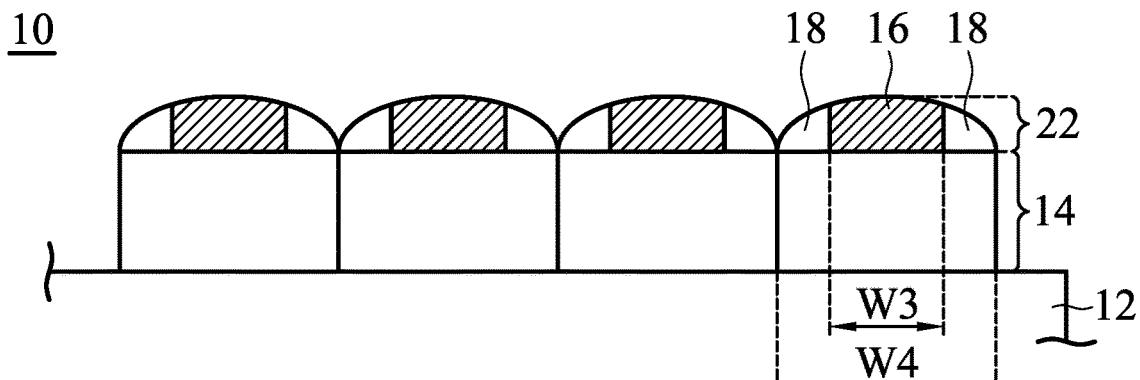
FIG. 4 is a cross-sectional view of an optical element in accordance with one embodiment of the invention.

Referring to FIG. 4, in accordance with one embodiment of the invention, an optical element 10 is provided. FIG. 4 shows a cross-sectional view of the optical element 10.

The optical element 10 comprises a substrate 12, a plurality of color filters 14 and a plurality of microlenses 22. The color filters 14 are formed on the substrate 12. The microlenses 22 are formed on the color filters 14. At least one of the microlenses 22 comprises an implant area 16 and a non-implant area 18. The implant area 16 has a first refractive index. The non-implant area 18 has a second refractive index. The implant area 16 is adjacent to the non-implant area 18. The first refractive index is greater than the second refractive index. That is, the refractive index of the implant area 16 is greater than that of the non-implant area 18. The plurality of color filters 14 are arranged as in rows and columns to form a color filter array (an array structure). The plurality of microlenses 22 are arranged as in rows and columns to form a microlens array (an array structure).

In some embodiments, the implant area 16 contained in the microlenses 22 extends from the top to the bottom of the microlenses 22. Therefore, the implant area 16 is formed as a "light guide" in the microlenses 22.

In some embodiments, other suitable profiles for the implant area 16 which extend from the top to the bottom of the microlenses 22 are also feasible.

In some embodiments, the implant area 16 has a refractive index which is greater than about 1.75.

In some embodiments, the color filters 14 may comprise suitable polymers, for example poly(methyl methacrylate) (PMMA), and pigments.

In some embodiments, the color filters 14 may comprise green (G) color filters, red (R) color filters and blue (B) color filters.

In some embodiments, the microlenses 22 may comprise suitable polymers, for example poly(methyl methacrylate) (PMMA).

In some embodiments, all of the microlenses 22 comprise the implant area 16 and the non-implant area 18.

In some embodiments, merely some of the microlenses 22 comprise the implant area 16 and the non-implant area 18, which depends on the demands of practical application.

In some embodiments, the implant area 16 may comprise high-refractive-index dopants, for example dopants having a higher refractive index than 2.0 like nitrogen ion or silicon ion.

In the invention, as long as the refractive index of the implanted dopants is higher than that of the conventional microlenses to about 0.1 or above, a light guide effect is obtained in the microlenses 22.

In some embodiments, the implant area 16 has a width W3 which is about 50-95% of a width W4 of the microlens 22.

In some embodiments, the implant area 16 has an implant concentration greater than $1\times10^{13}$ cm$^{-2}$, for example, ranging from about $1\times10^{13}$ cm$^{-2}$ to about $6.7\times10^{13}$ cm$^{-2}$.

In some embodiments, the optimal range of an implant concentration (i.e. implant dose) under a specific implant energy (for example 300 keV) which is applied to the microlenses 22 is defined in accordance with the following conditions. For incident light with a specific wavelength range, such as visible light with a longer wavelength than 400 nm, after an ion implantation process with an optimal implant concentration is performed on the microlenses 22, the refractive index (n) of the microlenses 22 is improved but the extinction coefficient (k) of the microlenses 22 is maintained: that is, in addition to the formation of a light guide for the incident light in the microlenses 22, the transmittance of the microlenses 22 to the incident light is still maintained.

In some embodiments, the depth and profile of the implant area 16 are controlled by adjusting the implant concentration (i.e. implant dose) and the implant energy of the ion implantation process.

Figure 5:
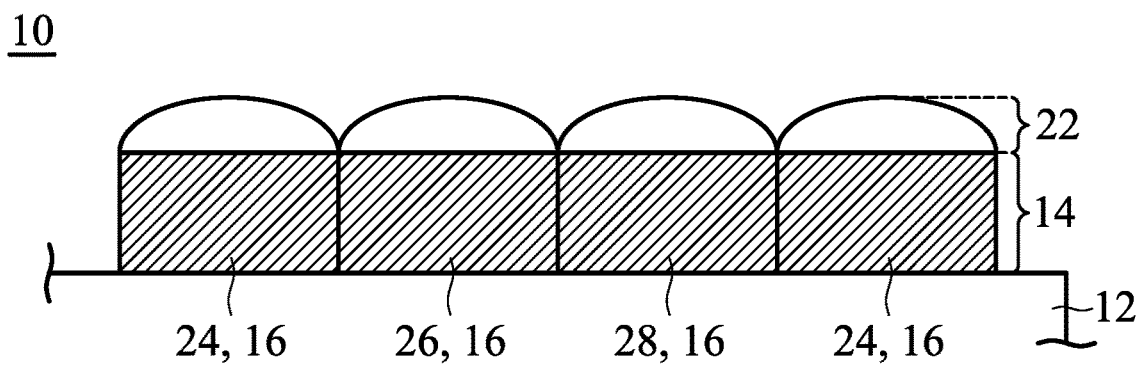
FIG. 5 is a cross-sectional view of an optical element in accordance with one embodiment of the invention.

Referring to FIG. 5, in accordance with one embodiment of the invention, an optical element 10 is provided. FIG. 5 shows a cross-sectional view of the optical element 10.

The optical element 10 comprises a substrate 12, a plurality of color filters 14 and a plurality of microlenses 22. The color filters 14 are formed on the substrate 12. The microlenses 22 are formed on the color filters 14. At least one of the color filters 14 comprises an implant area 16. The plurality of color filters 14 are arranged as in rows and columns to form a color filter array (an array structure). The plurality of microlenses 22 are arranged as in rows and columns to form a microlens array (an array structure).

In some embodiments, whole color filter 14 is the implant area 16.

In some embodiments, the color filters 14 may comprise suitable polymers, for example poly(methyl methacrylate) (PMMA), and pigments.

In some embodiments, the color filters 14 comprise green (G) color filters 24, red (R) color filters 26 and blue (B) color filters 28.

In some embodiments, all of the color filters 14 comprise the implant area 16.

In some embodiments, merely some of the color filters 14 comprise the implant area 16, which depends on the demands of practical application.

In some embodiments, the implant area 16 may comprise high-refractive-index dopants, for example dopants having a higher refractive index than 2.0 like nitrogen ion or silicon ion.

In some embodiments, the implant area 16 has an implant concentration greater than $1\times10^{13}$ cm$^{-2}$, for example, ranging from about $1\times10^{13}$ cm$^{-2}$ to about $6.7\times10^{13}$ cm$^{-2}$.

In some embodiments, the color filters 14 have the same implant concentration.

In some embodiments, the color filters 14 each have a different implant concentration.

In the invention, the refractive indexes among the color filters 14 are controlled by adjusting the implant concentration (i.e. implant dose) of the ion implantation process so that the refractive indexes among the color filters 14 achieve an optimal matching. For example, an ion implantation process with varying implant doses to the green (G) color filter 24, the red (R) color filter 26 and the blue (B) color filter 28 is performed on the color filters 14 so that the refractive index of the green (G) color filter 24 is larger than that of the red (R) color filter 26 to about 0.3, and the red (R) color filter 26 is larger than that of the blue (B) color filter 28 to about 0.1, and an improved SNR 10 is achieved.

In some embodiments, the microlenses 22 may comprise suitable polymers, for example poly(methyl methacrylate) (PMMA).

Figure 6A:
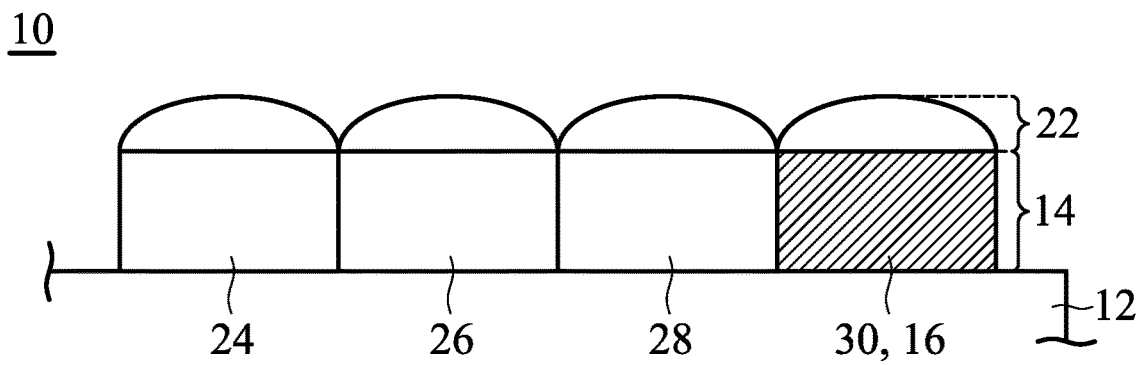
FIG. 6A is a cross-sectional view of an optical element in accordance with one embodiment of the invention.

Referring to FIG. 6A, in accordance with one embodiment of the invention, an optical element 10 is provided. FIG. 6A shows a cross-sectional view of the optical element 10.

The optical element 10 comprises a substrate 12, a plurality of color filters 14 and a plurality of microlenses 22. The color filters 14 are formed on the substrate 12. The microlenses 22 are formed on the color filters 14. At least one of the color filters 14 comprises an implant area 16. The plurality of color filters 14 are arranged as in rows and columns to form a color filter array (an array structure). The plurality of microlenses 22 are arranged as in rows and columns to form a microlens array (an array structure).

In some embodiments, whole color filter 14 is the implant area 16.

In some embodiments, the color filters 14 may comprise suitable polymers, for example poly(methyl methacrylate) (PMMA), and pigments.

In some embodiments, the color filters 14 comprise green (G) color filters 24, red (R) color filters 26, blue (B) color filters 28 and IR-pass filters 30.

In some embodiments, the IR-pass filter 30 is located at a sensing area (not shown) of the substrate 12.

In some embodiments, the IR-pass filter 30 comprises an implant area 16. The green (G) color filters 24, the red (R) color filters 26 or the blue (B) color filters 28 or a combination thereof may or may not comprise the implant area 16, which depends on the demands of practical application.

In some embodiments, all of the green (G) color filters 24, the red (R) color filters 26, the blue (B) color filters 28 and the IR-pass filters 30 simultaneously comprise an implant area 16.

In some embodiments, any one of the green (G) color filters 24, the red (R) color filters 26, the blue (B) color filters 28 and the IR-pass filters 30 comprises an implant area 16.

In some embodiments, the implant area 16 may comprise high-refractive-index dopants, for example dopants having a higher refractive index than 2.0 like nitrogen ion or silicon ion.

In some embodiments, the implant area 16 of the IR-pass filters 30 has an implant concentration which is greater than about $3.3\times10^{13}$ cm$^{-2}$.

In some embodiments, the implant area 16 of the green (G) color filters 24, the red (R) color filters 26 or the blue (B) color filters 28 or a combination thereof has an implant concentration greater than $1\times10^{13}$ cm$^{-2}$, for example, ranging from about $1\times10^{13}$ cm$^{-2}$ to about $6.7\times10^{13}$ cm$^{-2}$.

In the invention, the optimal range of an implant concentration (i.e. implant dose) under a specific implant energy (for example 300 keV) which is applied to the IR-pass filters 30 is defined in accordance with the following conditions. For incident light with a specific wavelength range, such as visible light with a wavelength ranging from 300 nm to 700 nm, after an ion implantation process with an optimal implant concentration is performed on the IR-pass filters 30, the refractive index (n) of the IR-pass filters 30 is improved and the extinction coefficient (k) of the IR-pass filters 30 is also increased, so that the transmittance of the IR-pass filters 30 to the incident light (i.e. visible light) is sufficiently decreased. For example, the transmittance of the IR-pass filters 30 to the incident light (i.e. visible light) is decreased from more than about 5% to less than about 5% by performing an ion implantation process with a specific implant dose on the IR-pass filters 30.

In some embodiments, the microlenses 22 may comprise suitable polymers, for example poly(methyl methacrylate) (PMMA).

Referring to FIG. 6B, in accordance with another embodiment of the invention, an optical element 10 is provided. FIG. 6B shows a cross-sectional view of the optical element 10.

The optical element 10 comprises a substrate 12 including a sensing area 34 and a peripheral area 36, a plurality of color filters 14 and a plurality of microlenses 22. The color filters 14 are formed on the substrate 12. The microlenses 22 are formed on the color filters 14. At least one of the color filters 14 comprises an implant area 16. The plurality of color filters 14 are arranged as in rows and columns to form a color filter array (an array structure). The plurality of microlenses 22 are arranged as in rows and columns to form a microlens array (an array structure).

In some embodiments, whole color filter 14 is the implant area 16.

In some embodiments, the color filters 14 may comprise suitable polymers, for example poly(methyl methacrylate) (PMMA), and pigments.

In some embodiments, the color filters 14 comprise green (G) color filters 24, red (R) color filters 26, blue (B) color filters 28 and black filters 32.

In some embodiments, the green (G) color filters 24, the red (R) color filters 26 and the blue (B) color filters 28 are located at the sensing area 34 of the substrate 12. The black filters 32 are located at the peripheral area 36 of the substrate 12.

In some embodiments, the black filter 32 comprises an implant area 16. The green (G) color filters 24, the red (R) color filters 26 or the blue (B) color filters 28 or a combination thereof may or may not comprise the implant area 16, which depends on the demands of practical application.

In some embodiments, all of the green (G) color filters 24, the red (R) color filters 26, the blue (B) color filters 28 and the black filters 32 simultaneously comprise an implant area 16.

In some embodiments, any one of the green (G) color filters 24, the red (R) color filters 26, the blue (B) color filters 28 and the black filters 32 comprises an implant area 16.

In some embodiments, the implant area 16 may comprise high-refractive-index dopants, for example dopants having a higher refractive index than 2.0 like nitrogen ion or silicon ion.

In some embodiments, the implant area 16 of the black filters 32 has an implant concentration which is higher than about $3.3 \times 10^{13}$ cm$^{-2}$.

In some embodiments, the implant area 16 of the green (G) color filters 24, the red (R) color filters 26 or the blue (B) color filters 28 or a combination thereof has an implant concentration greater than $1 \times 10^{13}$ cm$^{-2}$, for example, ranging from about $1 \times 10^{13}$ cm$^{-2}$ to about $6.7 \times 10^{13}$ cm$^{-2}$.

In the invention, the optimal range of an implant concentration (i.e. implant dose) under a specific implant energy (for example 300 keV) which is applied to the black filters 32 is defined in accordance with the following conditions. For incident light with a specific wavelength range, such as various light with a wavelength ranging from 300 nm to 1,000 nm, after an ion implantation process with an optimal implant concentration is performed on the black filters 32, the refractive index (n) of the black filters 32 is improved and the extinction coefficient (k) of the black filters 32 is also increased, so that the transmittance of the black filters 32 to the incident light is sufficiently decreased. For example, the transmittance of the black filters 32 to the incident light is decreased from about 1% to less than about 0.1% by performing an ion implantation process with a specific implant dose on the black filters 32.

In some embodiments, the microlenses 22 may comprise suitable polymers, for example poly(methyl methacrylate) (PMMA).

In some embodiments, the microlenses 22 formed on the black filters 32 may be optionally.

Figure 6D:
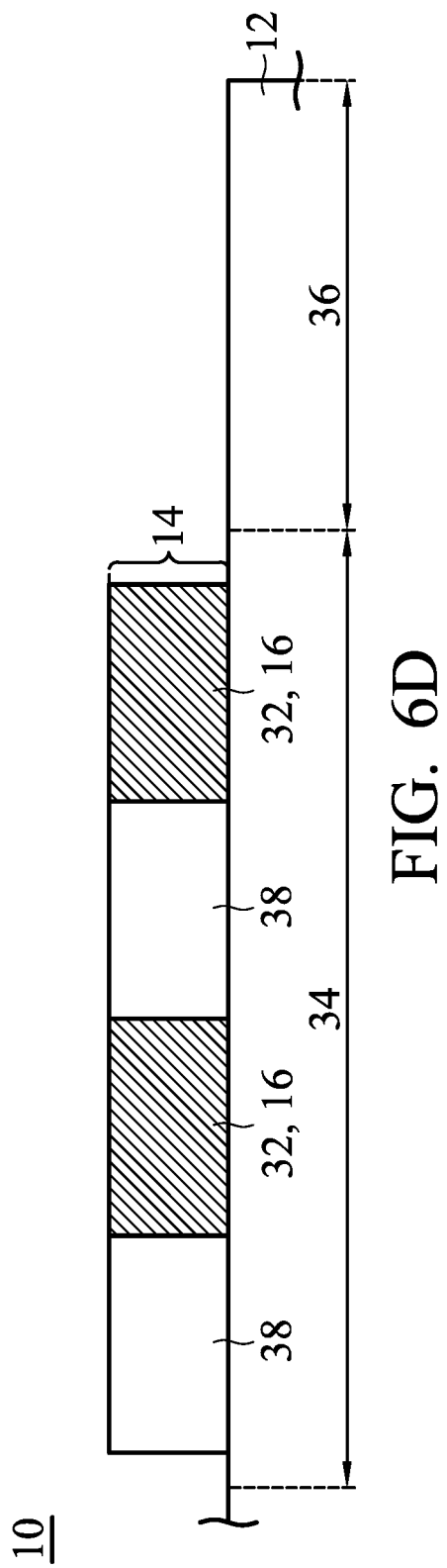
FIG. 6D is a cross-sectional view of an optical element in accordance with one embodiment of the invention.

Referring to FIGS. 6C and 6D, in accordance with other embodiments of the invention, an optical element 10 is provided. FIGS. 6C and 6D show cross-sectional views of the optical element 10.

Referring to FIG. 6C, the optical element 10 comprises a substrate 12 including a sensing area 34 and a peripheral area 36, a plurality of color filters 14 and a plurality of microlenses 22. The color filters 14 are formed on the substrate 12. The microlenses 22 are optionally formed on the color filters 14. At least one of the color filters 14 comprises an implant area 16. The plurality of color filters 14 are arranged as in rows and columns to form a color filter array (an array structure).

In some embodiments, whole color filter 14 is the implant area 16.

In some embodiments, the color filters 14 may comprise suitable polymers, for example poly(methyl methacrylate) (PMMA), and pigments.

In some embodiments, the color filters 14 comprise transparent filters 38 and black filters 32 disposed in an alternating manner with each other.

In some embodiments, the transparent filters 38 and the black filters 32 are located at the sensing area 34 of the substrate 12.

In some embodiments, the black filter 32 or the transparent filters 38 comprise the implant area 16, which depends on the demands of practical application.

In some embodiments, all of the black filters 32 and the transparent filters 38 simultaneously comprise an implant area 16.

In some embodiments, any one of the black filters 32 and the transparent filters 38 comprises an implant area 16.

In some embodiments, the implant area 16 may comprise high-refractive-index dopants, for example dopants having a higher refractive index than 2.0 like nitrogen ion or silicon ion.

In some embodiments, the implant area 16 of the black filters 32 has an implant concentration which is higher than about $3.3 \times 10^{13}$ cm$^{-2}$.

In some embodiments, the implant area 16 of the transparent filters 38 has an implant concentration greater than $1 \times 10^{13}$ cm$^{-2}$, for example, ranging from about $1 \times 10^{13}$ cm$^{-2}$ to about $6.7 \times 10^{13}$ cm$^{-2}$.

In some embodiments, the microlenses 22 may comprise suitable polymers, for example poly(methyl methacrylate) (PMMA).

In some embodiments, the microlenses 22 are formed on the transparent filters 38, but not formed on the black filters 32, as shown in FIG. 6C.

In some embodiments, no microlens is formed on the transparent filters 38 and the black filters 32, as shown in FIG. 6D.

Figure 7A:
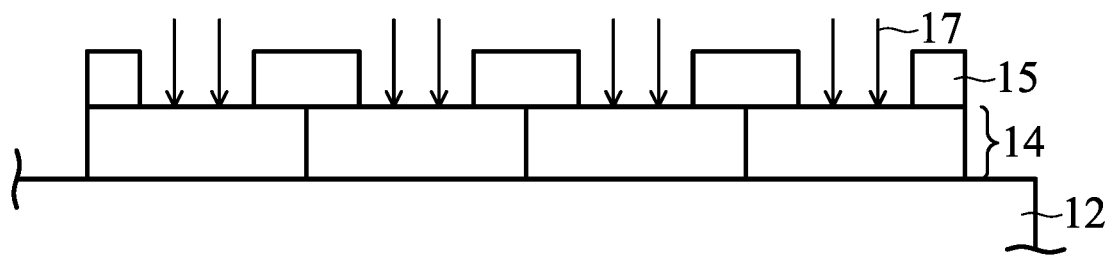
FIGS. 7A-7B are cross-sectional views of a method for fabricating an optical element in accordance with one embodiment of the invention.
Figure 7B:
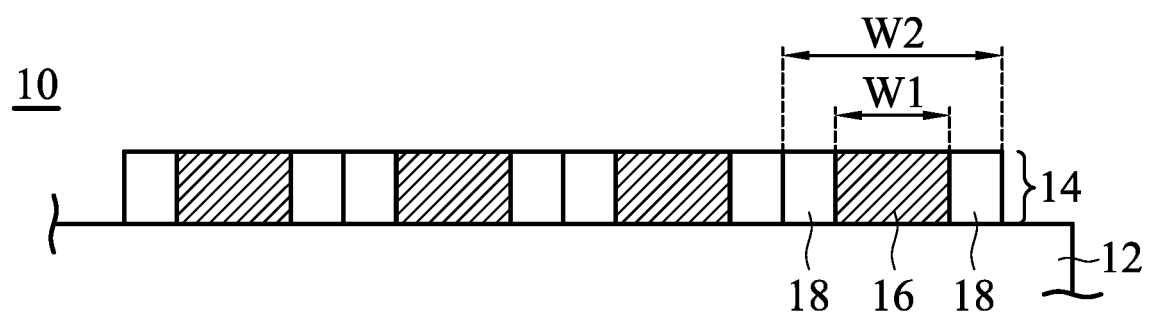

Referring to FIGS. 7A-7B, in accordance with one embodiment of the invention, a method for fabricating the optical element 10 of FIG. 1 is provided. FIGS. 7A-7B show cross-sectional views of the method for fabricating the optical element 10.

Referring to FIG. 7A, a substrate 12 having a plurality of color filters 14 formed thereon is provided. A patterned photoresist layer 15 is then formed on the color filters 14, exposing the areas which are subsequently to be defined as implant areas.

Next, an ion implantation process 17 is performed on the color filters 14 to form a plurality of implant areas 16 in the color filters 14, as shown in FIG. 7B.

In some embodiments, after the ion implantation process 17, the implant area 16 and a non-implant area 18 are formed in the color filters 14. The implant area 16 has a first refractive index. The non-implant area 18 has a second refractive index. The implant area 16 is adjacent to the non-implant area 18. The first refractive index is higher than the second refractive index. That is, the refractive index of the implant area 16 is higher than that of the non-implant area 18.

In some embodiments, the implant area 16 formed in the color filter 14 extends from the top to the bottom of the color filter 14. Therefore, the implant area 16 is formed as a "light guide" in the color filters 14.

In some embodiments, other suitable profiles for the implant area 16 which extend from the top to the bottom of the color filter 14 are also feasible.

In some embodiments, the color filters 14 may comprise suitable polymers, for example poly(methyl methacrylate) (PMMA), and pigments.

In some embodiments, the color filters 14 may comprise green (G) color filters, red (R) color filters and blue (B) color filters.

In some embodiments, all of the color filters 14 are implanted to form the implant area 16 and the non-implant area 18 therein.

In some embodiments, merely some of the color filters 14 are implanted to form the implant area 16 and the non-implant area 18 therein, which depends on the demands of practical application.

In some embodiments, dopants provided by the ion implantation process 17 may comprise high-refractive-index dopants, for example dopants having a higher refractive index than 2.0 like nitrogen ion or silicon ion.

In the invention, as long as the refractive index of the implanted dopants is higher than that of the original color filters 14 to about 0.1 or above, a light guide effect is obtained in the color filters 14.

In some embodiments, the formed implant area 16 has a width W1 which is about 50-95% of a width W2 of the color filter 14.

In some embodiments, the implant dose provided by the ion implantation process 17 may range from about $1\times10^{13}$ $cm^{-2}$ to about $6.7\times10^{13}$ $cm^{-2}$.

In some embodiments, the optimal range of an implant concentration (i.e. implant dose) under a specific implant energy (for example 300 keV) which is applied to the color filters 14 is defined in accordance with the following conditions. For incident light with a specific wavelength range, such as visible light with a longer wavelength than 400 nm, after an ion implantation process with an optimal implant concentration (ex. ranging from about $1\times10^{13}$ $cm^{-2}$ to about $6.7\times10^{13}$ $cm^{-2}$) is performed on the color filters 14, the refractive index (n) of the color filters 14 is improved but the extinction coefficient (k) of the color filters 14 is maintained: that is, in addition to the formation of a light guide for the incident light in the color filters 14, the transmittance of the color filters 14 to the incident light is still maintained.

In some embodiments, the depth and profile of the implant area 16 are controlled by adjusting the implant concentration (i.e. implant dose) and the implant energy of the ion implantation process.

Thus, the optical element 10 of FIG. 1 is fabricated.

Figure 8A:
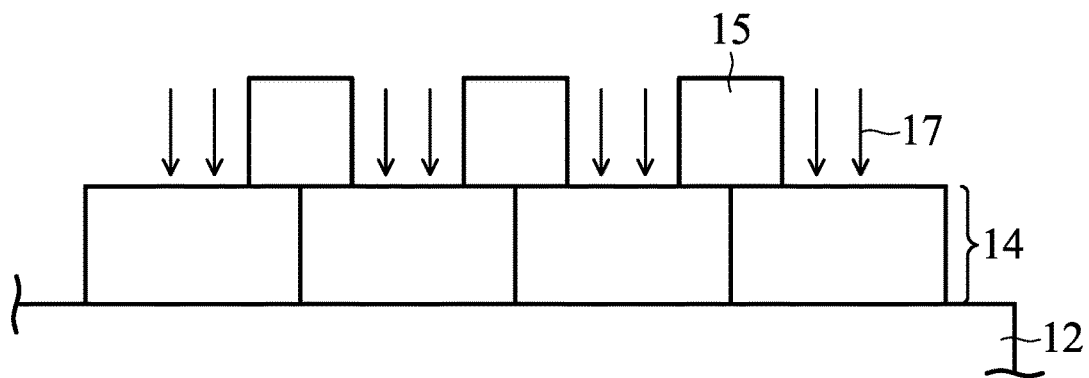
FIGS. 8A-8C are cross-sectional views of a method for fabricating an optical element in accordance with one embodiment of the invention.
Figure 8B:
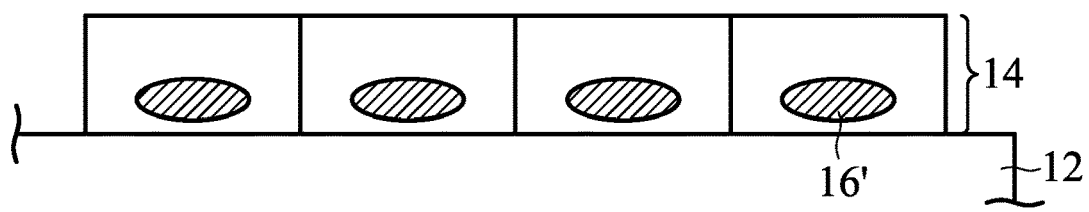
Figure 8C:
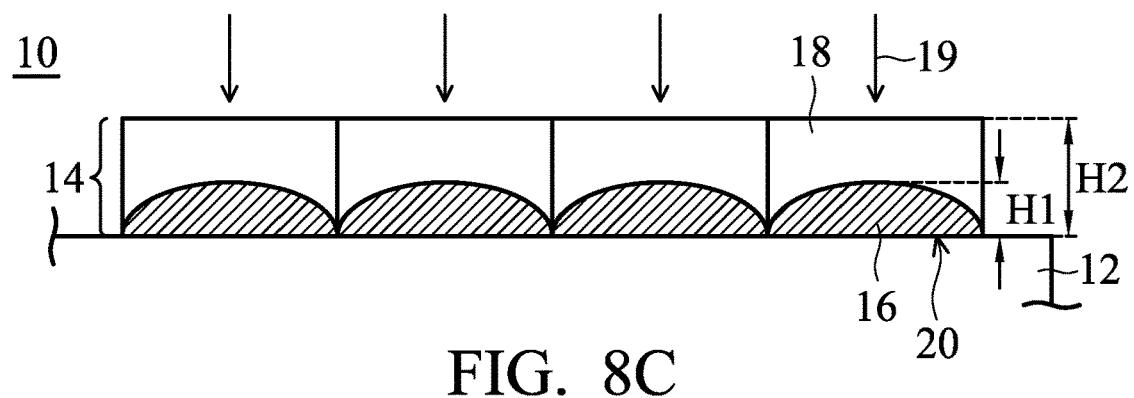

Referring to FIGS. 8A-8C, in accordance with one embodiment of the invention, a method for fabricating the optical element 10 of FIG. 2 is provided. FIGS. 8A-8C show cross-sectional views of the method for fabricating the optical element 10.

Referring to FIG. 8A, a substrate 12 having a plurality of color filters 14 formed thereon is provided. A patterned photoresist layer 15 is then formed on the color filters 14, exposing the areas which are subsequently to be defined as implant areas.

Next, an ion implantation process 17 is performed on the color filters 14 to form a plurality of pre-implant areas 16' in the color filters 14, as shown in FIG. 8B.

Next, a thermal treatment 19 is performed so that the pre-implant areas 16' are diffused further to form a plurality of implant areas 16 in the color filters 14, as shown in FIG. 8C.

In some embodiments, after the ion implantation process 17 and the thermal treatment 19, the implant area 16 and a non-implant area 18 are formed in the color filters 14. The implant area 16 has a first refractive index. The non-implant area 18 has a second refractive index. The implant area 16 is adjacent to the non-implant area 18. The first refractive index is higher than the second refractive index. That is, the refractive index of the implant area 16 is higher than that of the non-implant area 18.

In some embodiments, the implant area 16 formed in the color filter 14 is adjacent to the bottom 20 of the color filter 14, similar to a microlens profile. Therefore, the implant area 16 is formed as a "condenser" in the color filters 14.

In some embodiments, the first refractive index of the implant area 16 is a gradient refractive index that increases towards the bottom 20 of the color filter 14.

In some embodiments, other suitable profiles for the implant area 16 adjacent to the bottom 20 of the color filter 14 are also feasible.

In some embodiments, the color filters 14 may comprise suitable polymers, for example poly(methyl methacrylate) (PMMA), and pigments.

In some embodiments, the color filters 14 may comprise green (G) color filters, red (R) color filters and blue (B) color filters.

In some embodiments, all of the color filters 14 are implanted and treated by a thermal process to form the implant area 16 and the non-implant area 18 therein.

In some embodiments, merely some of the color filters 14 are implanted and treated by a thermal process to form the implant area 16 and the non-implant area 18 therein, which depends on the demands of practical application.

In some embodiments, dopants provided by the ion implantation process 17 may comprise high-refractive-index dopants, for example dopants having a higher refractive index than 2.0 like nitrogen ion or silicon ion.

In the invention, as long as the refractive index of the implanted dopants is higher than that of the original color filters 14 to about 0.1 or above, a condenser effect is obtained in the color filters 14.

In some embodiments, the formed implant area 16 has a height H1 which is at least 50% of a height H2 of the color filter 14.

In the invention, the implant area 16 (i.e. a condenser) is formed in the color filters 14 and the quantum effect (QE) is thus improved. Specifically, when the height H1 of the implant area 16 is larger than 50% of the height H2 of the color filter 14, the improvement of the quantum effect (QE) is more significant.

In some embodiments, the implant dose provided by the ion implantation process 17 may range from about $1 \times 10^{13}$ cm$^{-2}$ to about $6.7 \times 10^{13}$ cm$^{-2}$.

In some embodiments, the optimal range of an implant concentration (i.e. implant dose) under a specific implant energy (for example 300 keV) which is applied to the color filters 14 is defined in accordance with the following conditions. For incident light with a specific wavelength range, such as visible light with a longer wavelength than 400 nm, after an ion implantation process with an optimal implant concentration (ex. ranging from about $1 \times 10^{13}$ cm$^{-2}$ to about $6.7 \times 10^{13}$ cm$^{-2}$) is performed on the color filters 14, the refractive index (n) of the color filters 14 is improved but the extinction coefficient (k) of the color filters 14 is maintained: that is, in addition to the formation of a condenser for collecting the incident light in the color filters 14, the transmittance of the color filters 14 to the incident light is still maintained.

In some embodiments, the depth and profile of the implant area 16 are controlled by adjusting the implant concentration (i.e. implant dose) and the implant energy of the ion implantation process.

Thus, the optical element 10 of FIG. 2 is fabricated.

Figure 9A:
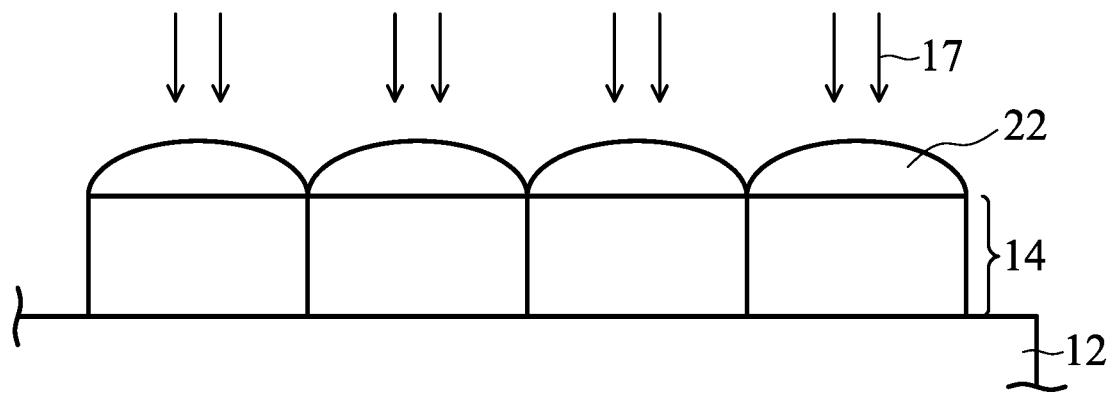
FIGS. 9A-9B are cross-sectional views of a method for fabricating an optical element in accordance with one embodiment of the invention.
Figure 9B:
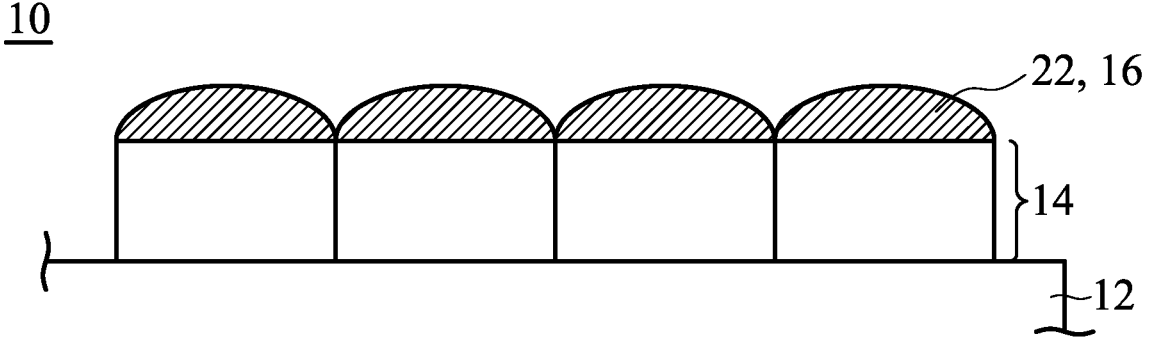

Referring to FIGS. 9A-9B, in accordance with one embodiment of the invention, a method for fabricating the optical element 10 of FIG. 3 is provided. FIGS. 9A-9B show cross-sectional views of the method for fabricating the optical element 10.

Referring to FIG. 9A, a substrate 12 having a plurality of color filters 14 and a plurality of microlenses 22 formed thereon in order is provided.

Next, an ion implantation process 17 is performed on the microlenses 22 to form a plurality of implant areas 16 in the microlenses 22, as shown in FIG. 9B.

In some embodiments, after the ion implantation process 17, the implant area 16 is formed in the microlenses 22. The refractive index of the implant area 16 is higher than that of conventional microlenses without applying an ion implantation process thereon. Therefore, the microlenses 22 comprising the implant area 16 generate an improved condenser effect.

In some embodiments, the microlens 22 is fully implanted without formation of non-implant area therein during the ion implantation process 17.

In some embodiments, the formed implant area 16 has a refractive index which is higher than about 1.75.

In some embodiments, the color filters 14 may comprise suitable polymers, for example poly(methyl methacrylate) (PMMA), and pigments.

In some embodiments, the color filters 14 may comprise green (G) color filters, red (R) color filters and blue (B) color filters.

In some embodiments, the microlenses 22 may comprise suitable polymers, for example poly(methyl methacrylate) (PMMA).

In some embodiments, all of the microlenses 22 are implanted to form the implant area 16 therein.

In some embodiments, merely some of the microlenses 22 are implanted to form the implant area 16 therein, which depends on the demands of practical application.

In some embodiments, dopants provided by the ion implantation process 17 may comprise high-refractive-index dopants, for example dopants having a higher refractive index than 2.0 like nitrogen ion or silicon ion.

In the invention, as long as the refractive index of the implanted dopants is higher than that of the conventional microlenses to about 0.1 or above, the improved condenser effect is obtained in the microlenses 22 comprising the implant area 16.

In some embodiments, the implant dose provided by the ion implantation process 17 may range from about $1 \times 10^{13}$ cm$^{-2}$ to about $6.7 \times 10^{13}$ cm$^{-2}$.

In some embodiments, the optimal range of an implant concentration (i.e. implant dose) under a specific implant energy (for example 300 keV) which is applied to the microlenses 22 is defined in accordance with the following conditions. For incident light with a specific wavelength range, such as visible light with a longer wavelength than 400 nm, after an ion implantation process with an optimal implant concentration (ex. ranging from about $1 \times 10^{13}$ cm$^{-2}$ to about $6.7 \times 10^{13}$ cm$^{-2}$) is performed on the microlenses 22, the refractive index (n) of the microlenses 22 is improved but the extinction coefficient (k) of the microlenses 22 is maintained: that is, in addition to improvement of collecting the incident light in the microlenses 22, the transmittance of the microlenses 22 to the incident light is still maintained.

Thus, the optical element 10 of FIG. 3 is fabricated.

Figure 10A:
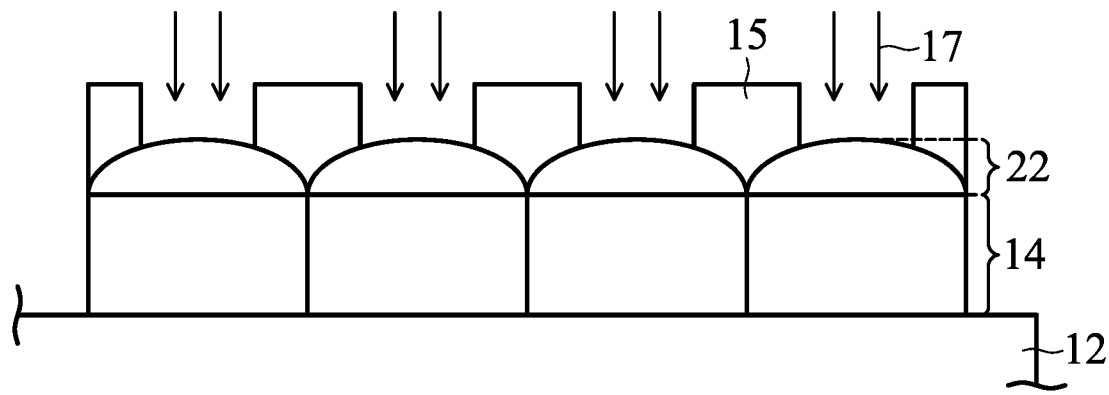
FIGS. 10A-10B are cross-sectional views of a method for fabricating an optical element in accordance with one embodiment of the invention.
Figure 10B:
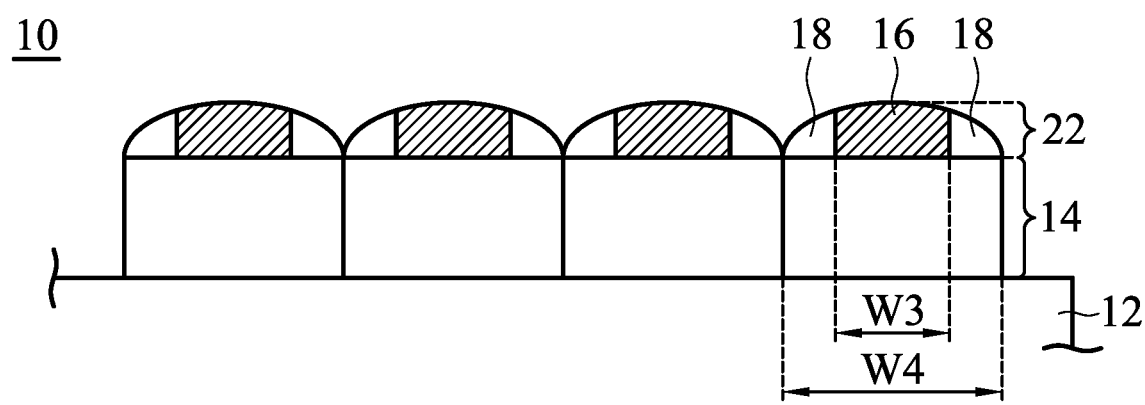

Referring to FIGS. 10A-10B, in accordance with one embodiment of the invention, a method for fabricating the optical element 10 of FIG. 4 is provided. FIGS. 10A-10B show cross-sectional views of the method for fabricating the optical element 10.

Referring to FIG. 10A, a substrate 12 having a plurality of color filters 14 and a plurality of microlenses 22 formed thereon in order is provided. A patterned photoresist layer 15 is then formed on the microlenses 22, exposing the areas which are subsequently to be defined as implant areas.

Next, an ion implantation process 17 is performed on the microlenses 22 to form a plurality of implant areas 16 in the microlenses 22, as shown in FIG. 10B.

In some embodiments, after the ion implantation process 17, the implant area 16 and a non-implant area 18 are formed in the microlenses 22. The implant area 16 has a first refractive index. The non-implant area 18 has a second refractive index. The implant area 16 is adjacent to the non-implant area 18. The first refractive index is higher than the second refractive index. That is, the refractive index of the implant area 16 is higher than that of the non-implant area 18.

In some embodiments, the implant area 16 formed in the microlens 22 extends from the top to the bottom of the microlens 22. Therefore, the implant area 16 is formed as a "light guide" in the microlenses 22.

In some embodiments, other suitable profiles for the implant area 16 which extend from the top to the bottom of the microlens 22 are also feasible.

In some embodiments, the formed implant area 16 has a refractive index which is higher than about 1.75.

In some embodiments, the color filters 14 may comprise suitable polymers, for example poly(methyl methacrylate) (PMMA), and pigments.

In some embodiments, the color filters 14 may comprise green (G) color filters, red (R) color filters and blue (B) color filters.

In some embodiments, the microlenses 22 may comprise suitable polymers, for example poly(methyl methacrylate) (PMMA).

In some embodiments, all of the microlenses 22 are implanted to form the implant area 16 and the non-implant area 18 therein.

In some embodiments, merely some of the microlenses 22 are implanted to form the implant area 16 and the non-implant area 18 therein, which depends on the demands of practical application.

In some embodiments, dopants provided by the ion implantation process 17 may comprise high-refractive-index dopants, for example dopants having a higher refractive index than 2.0 like nitrogen ion or silicon ion.

In the invention, as long as the refractive index of the implanted dopants is higher than that of the conventional microlenses to about 0.1 or above, a light guide effect is obtained in the microlenses 22.

In some embodiments, the formed implant area 16 has a width W3 which is about 50-95% of a width W4 of the microlens 22.

In some embodiments, the implant dose provided by the ion implantation process 17 ranges from about $1 \times 10^{13}$ cm$^{-2}$ to about $6.7 \times 10^{13}$ cm$^{-2}$.

In some embodiments, the optimal range of an implant concentration (i.e. implant dose) under a specific implant energy (for example 300 keV) which is applied to the microlenses 22 is defined in accordance with the following conditions. For incident light with a specific wavelength range, such as visible light with a longer wavelength than 400 nm, after an ion implantation process with an optimal implant concentration (ex. ranging from about $1 \times 10^{13}$ cm$^{-2}$ to about $6.7 \times 10^{13}$ cm$^{-2}$) is performed on the microlenses 22, the refractive index (n) of the microlenses 22 is improved but the extinction coefficient (k) of the microlenses 22 is maintained: that is, in addition to the formation of a light guide for the incident light in the microlenses 22, the transmittance of the microlenses 22 to the incident light is still maintained.

In some embodiments, the depth and profile of the implant area 16 are controlled by adjusting the implant concentration (i.e. implant dose) and the implant energy of the ion implantation process.

Thus, the optical element 10 of FIG. 4 is fabricated.

Referring to FIGS. 11A-11H, in accordance with one embodiment of the invention, a method for fabricating the optical element 10 of FIG. 5 is provided. FIGS. 11A-11H show cross-sectional views of the method for fabricating the optical element 10.

Figure 11A:
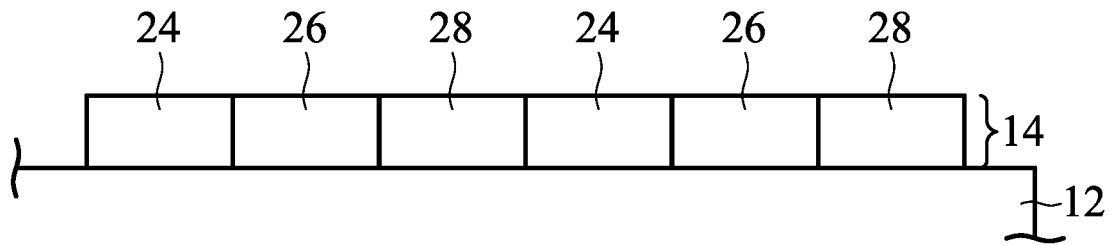
FIGS. 11A-11H are cross-sectional views of a method for fabricating an optical element in accordance with one embodiment of the invention.
Figure 11B:
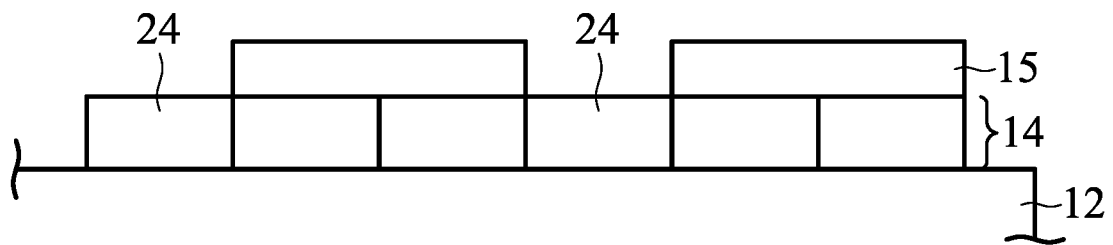

Referring to FIG. 11A, a substrate 12 having a plurality of color filters 14 formed thereon is provided. The color filters 14 comprise green (G) color filters 24, red (R) color filters 26 and blue (B) color filters 28. A first patterned photoresist layer 15 is then formed on the color filters 14, exposing the areas which are subsequently to be defined as implant areas, as shown in FIG. 11B.

In this step, the green (G) color filters 24 are exposed for subsequent definition as implant areas.

Figure 11C:
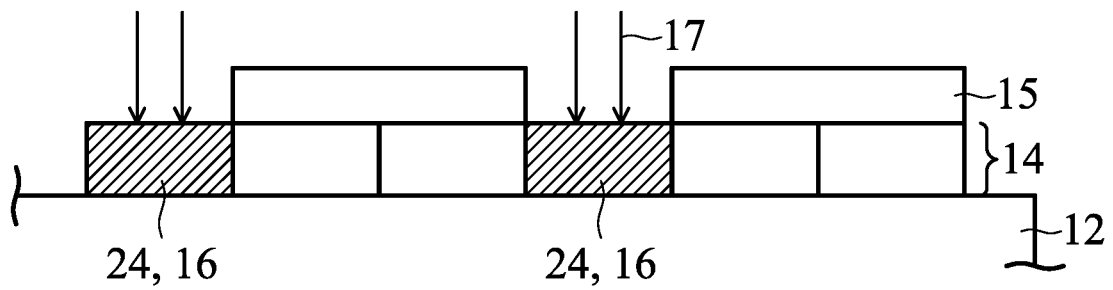

Next, a first ion implantation process 17 is performed on the color filters 14 to form a plurality of implant areas 16 in the color filters 14, as shown in FIG. 11C.

In this step, the green (G) color filters 24 are implanted to form the implant areas 16 therein.

Figure 11D:
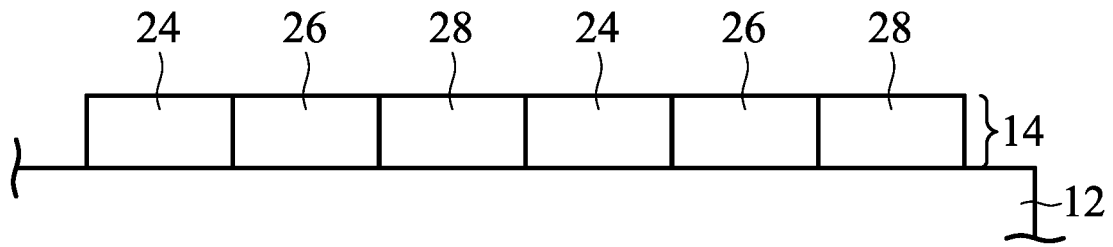

As shown in FIG. 11D, the first patterned photoresist layer 15 is then removed from above the color filters 14.

Figure 11E:
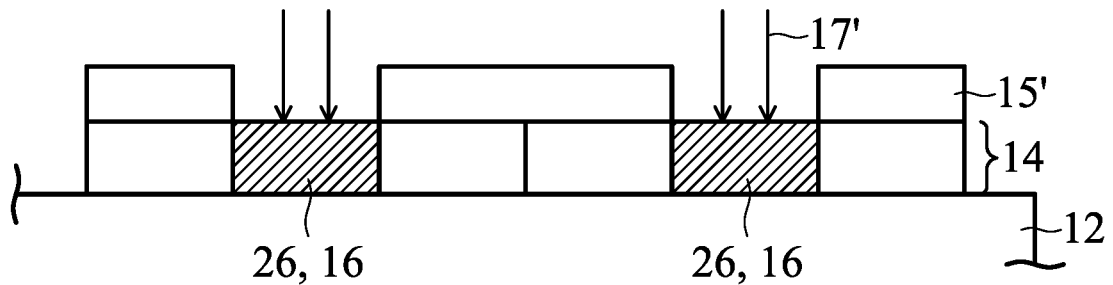

As shown in FIG. 11E, a second patterned photoresist layer 15' is then formed on the color filters 14, exposing the areas which are subsequently to be defined as implant areas.

In this step, the red (R) color filters 26 are exposed for subsequent definition as implant areas.

Next, a second ion implantation process 17' is performed on the color filters 14 to form a plurality of implant areas 16 in the color filters 14.

In this step, the red (R) color filters 26 are implanted to form the implant areas 16 therein.

Figure 11F:
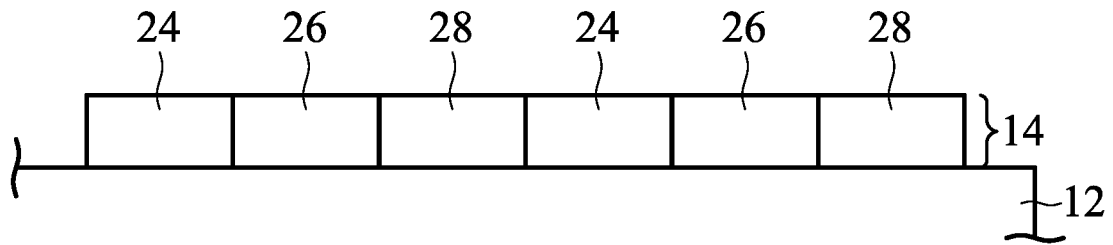

Similarly, as shown in FIG. 11F, the second patterned photoresist layer 15' is then removed from above the color filters 14.

Figure 11G:
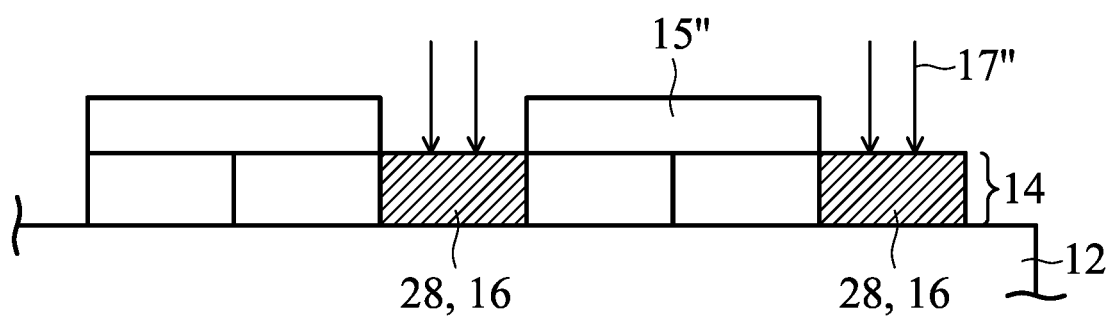

As shown in FIG. 11G, a third patterned photoresist layer 15" is then formed on the color filters 14, exposing the areas which are subsequently to be defined as implant areas.

In this step, the blue (B) color filters 28 are exposed for subsequent definition as implant areas.

Next, a third ion implantation process 17" is performed on the color filters 14 to form a plurality of implant areas 16 in the color filters 14.

In this step, the blue (B) color filters 28 are implanted to form the implant areas 16 therein.

Figure 11H:
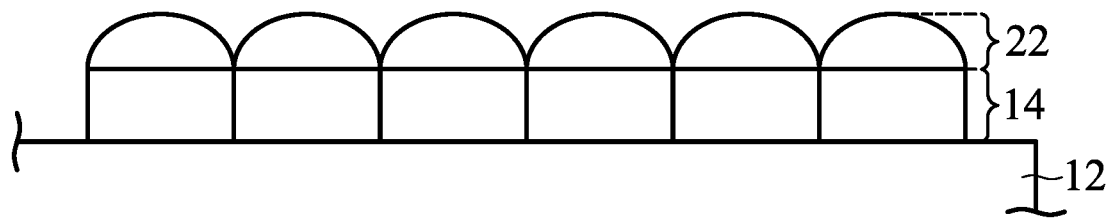

Next, a plurality of microlenses 22 are formed on the color filters 14, as shown in FIG. 11H.

In some embodiments, after the first, second and third ion implantation processes (17, 17' and 17"), the implant areas 16 are formed in the color filters 14.

In some embodiments, the color filters 14 are fully implanted without formation of non-implant area therein during the first, second and third ion implantation processes (17, 17' and 17").

In some embodiments, the color filters 14 may comprise suitable polymers, for example poly(methyl methacrylate) (PMMA), and pigments.

In some embodiments, all of the color filters 14 are implanted to form the implant areas 16 therein.

In some embodiments, merely some of the color filters 14 are implanted to form the implant areas 16 therein, which depends on the demands of practical application.

In some embodiments, dopants provided by the first, second and third ion implantation processes (17, 17' and 17") may comprise high-refractive-index dopants, for example dopants having a higher refractive index than 2.0 like nitrogen ion or silicon ion. In some embodiments, the implant dose provided by the first, second and third ion implantation processes (17, 17' and 17") may range from about $1 \times 10^{13}$ cm$^{-2}$ to about $6.7 \times 10^{13}$ cm$^{-2}$.

In some embodiments, the color filters 14 are implanted using the same implant concentration. That is, the first, second and third ion implantation processes (17, 17' and 17") provide the same implant dose.

In some embodiments, the color filters 14 are implanted using different implant concentration. That is, the first, second and third ion implantation processes (17, 17' and 17") provide different implant doses.

In the invention, the refractive indexes among the color filters 14 are controlled by adjusting the implant concentration (i.e. implant dose) of the ion implantation processes so that the refractive indexes among the color filters 14 achieve an optimal matching. For example, the first, second and third ion implantation processes (17, 17' and 17") with varying implant doses to the green (G) color filter 24, the red (R) color filter 26 and the blue (B) color filter 28 are performed on the color filters 14 in sequence so that the refractive index of the green (G) color filter 24 is larger than that of the red (R) color filter 26 to about 0.3, and the red (R) color filter 26 is larger than that of the blue (B) color filter 28 to about 0.1, and an improved SNR 10 is achieved.

In some embodiments, the microlenses 22 may comprise suitable polymers, for example poly(methyl methacrylate) (PMMA).

Thus, the optical element 10 of FIG. 5 is fabricated.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical element, comprising:
   an array structure having an implant area and a non-implant area adjacent to the implant area, wherein the implant area has an implant concentration greater than $1 \times 10^{13}$ cm$^{-2}$.

2. The optical element as claimed in claim 1, wherein the implant concentration ranges from $1 \times 10^{13}$ cm$^{-2}$ to $6.7 \times 10^{13}$ cm$^{-2}$.

3. The optical element as claimed in claim 1, wherein the implant area comprises nitrogen ion or silicon ion, and the implant area has a first refractive index and the non-implant area has a second refractive index, and the first refractive index is greater than the second refractive index.

4. The optical element as claimed in claim 1, wherein the array structure is a color filter array comprising a plurality of color filters, and at least one of the color filters has the implant area.

5. The optical element as claimed in claim 4, wherein the implant area has a width which is 50-95% of a width of the color filter having the implant area.

6. The optical element as claimed in claim 4, wherein the implant area is located at a bottom of the color filter having the implant area.

7. The optical element as claimed in claim 6, wherein the implant area has a height which is at least 50% of a height of the color filter having the implant area.

8. The optical element as claimed in claim 7, wherein the first refractive index of the implant area is a gradient refractive index that increases towards the bottom of the color filter having the implant area.

9. The optical element as claimed in claim 4, further comprising a substrate having a sensing area, wherein the color filter having the implant area comprises a black filter located at the sensing area of the substrate.

10. The optical element as claimed in claim 9, further comprising a transparent filter adjacent to the black filter.

11. The optical element as claimed in claim 10, further comprising a microlens formed on the transparent filter.

12. The optical element as claimed in claim 1, wherein the array structure comprises a color filter array comprising a plurality of color filters and a microlens array comprising a plurality of microlenses.

13. The optical element as claimed in claim 12, wherein at least one of the microlenses has the implant area.

14. The optical element as claimed in claim 13, wherein the implant area has a refractive index which is greater than 1.75.

15. The optical element as claimed in claim 13, wherein the implant area has a width which is 50-95% of a width of the microlens having the implant area.

16. The optical element as claimed in claim 12, wherein at least one of the color filters has the implant area, and the color filter having the implant area comprises a green color filter, a red color filter and/or a blue color filter.

17. The optical element as claimed in claim 12, wherein at least one of the color filters has the implant area, and the color filter having the implant area comprises an IR-pass filter or a black filter.

18. The optical element as claimed in claim 17, further comprising a substrate having a sensing area, wherein the IR-pass filter is located at the sensing area of the substrate.

19. The optical element as claimed in claim 17, further comprising a substrate having a peripheral area, wherein the black filter is located at the peripheral area of the substrate.

20. The optical element as claimed in claim 17, wherein the implant area has an implant concentration which is greater than $3.3 \times 10^{13}$ cm$^{-2}$.

* * * * *